United States Patent
Park et al.

(10) Patent No.: US 10,928,338 B2
(45) Date of Patent: Feb. 23, 2021

(54) SAMPLE HOLDER ASSEMBLY FOR EFFECTIVE THERMAL CONDUCTIVITY MEASUREMENT OF PEBBLE-BED IN LASER FLASH APPARATUS

(71) Applicant: KOREA BASIC SCIENCE INSTITUTE, Daejeon (KR)

(72) Inventors: Yi-Hyun Park, Daejeon (KR); Seungyon Cho, Daejeon (KR); Mu-Young Ahn, Daejeon (KR); Youngmin Lee, Daejeon (KR); Duck Young Ku, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 238 days.

(21) Appl. No.: 15/983,593

(22) Filed: May 18, 2018

(65) Prior Publication Data

US 2019/0302044 A1 Oct. 3, 2019

(30) Foreign Application Priority Data

Apr. 3, 2018 (KR) .................. 10-2018-0038527

(51) Int. Cl.
*G01N 25/18* (2006.01)
*G21C 1/07* (2006.01)
(Continued)

(52) U.S. Cl.
CPC .............. *G01N 25/18* (2013.01); *G21B 1/13* (2013.01); *G21C 1/07* (2013.01); *G21C 17/021* (2013.01); *G21C 17/06* (2013.01); *G21C 17/066* (2013.01)

(58) Field of Classification Search
CPC combination set(s) only.
See application file for complete search history.

(56) References Cited

U.S. PATENT DOCUMENTS

| 5,197,323 A * | 3/1993 | Osofsky ............. G01N 3/307 73/12.01 |
| 6,763,696 B1 * | 7/2004 | Thomas ............. G01M 9/04 73/12.09 |

(Continued)

FOREIGN PATENT DOCUMENTS

KR 1020070066199 6/2007

OTHER PUBLICATIONS

EPO translation of CN203980890U. (Year: 2014).*
(Continued)

*Primary Examiner* — Stephen D Meier
*Assistant Examiner* — Nasir U. Ahmed
(74) *Attorney, Agent, or Firm* — Norton Rose Fulbright US LLP

(57) ABSTRACT

The present disclosure provides a sample holder assembly for a laser flash apparatus for measuring a thermal conductivity of a pebble-bed, the assembly comprising: a tubular sample container configured to be mounted on a sample carrier tube for the laser flash apparatus, wherein the sample container has open top and bottom; a bottom disc disposed in the sample container to block the open bottom of the sample container and configured for delivering a laser from a laser flash unit of the apparatus to a pebble-bed; the pebble-bed packed on the bottom disc to a predetermined thickness; and a top disc disposed on the pebble-bed and in the sample container to block the open top of the sample container and configured for receiving heat from the pebble-bed to transfer the heat upward.

5 Claims, 10 Drawing Sheets

(51) Int. Cl.
G21C 17/06 (2006.01)
G21C 17/02 (2006.01)
G21B 1/13 (2006.01)

(56) References Cited

U.S. PATENT DOCUMENTS

2005/0058173 A1* 3/2005 Vetrovec .................. H01S 3/042
372/66
2016/0045886 A1* 2/2016 Kraus .................. B01J 19/0073
427/532

OTHER PUBLICATIONS

Cho et al. "R&D Progress of Korean HSBS TBM", pp. 386-391, Fusion Engineering and Design, 2012. (Year: 2012).*
Ahn et al., "Laser Flash Method for Effective Thermal Diffusivity Measurement of Pebble Beds" *National Fusion Research Institute*, 2011, 20 pages.
Lee et al., "Sample holder design for effective thermal conductivity measurement of pebble-bed using laser flash method" *Fusion Engineering and Design*, 2017, 124:995-998.

* cited by examiner

【FIG. 3】
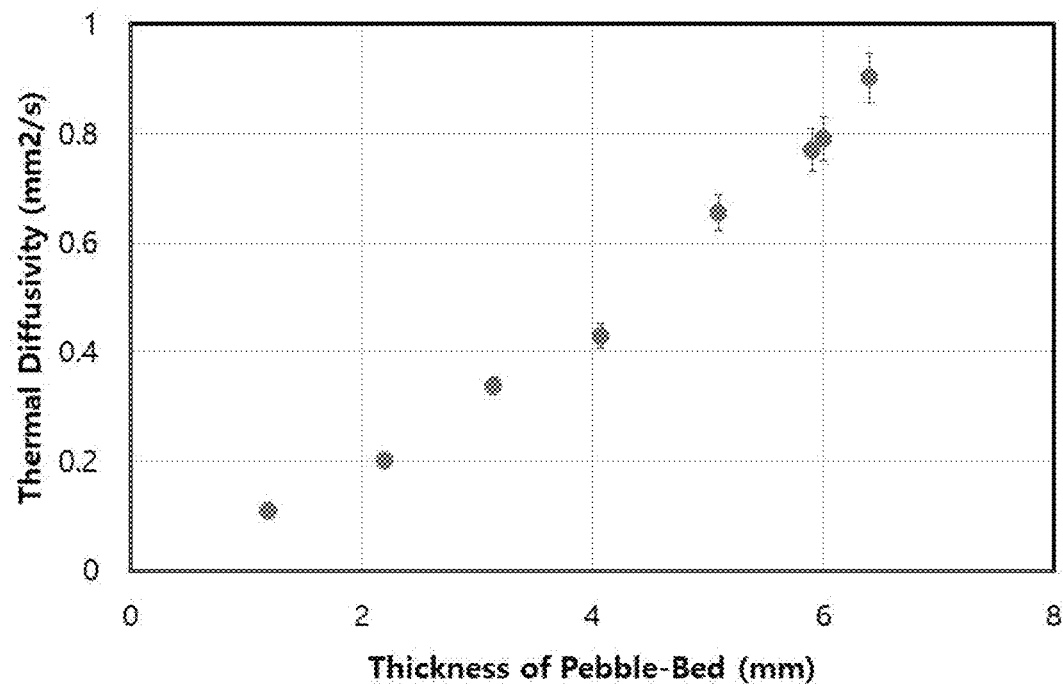
【FIG. 4】
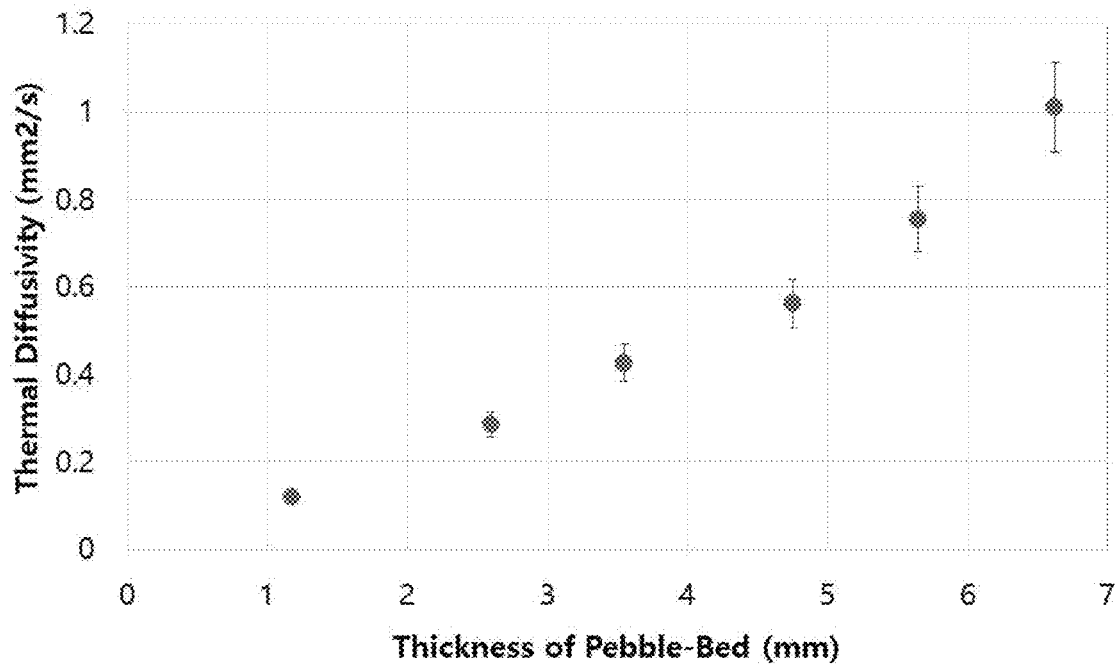

[FIG. 5]
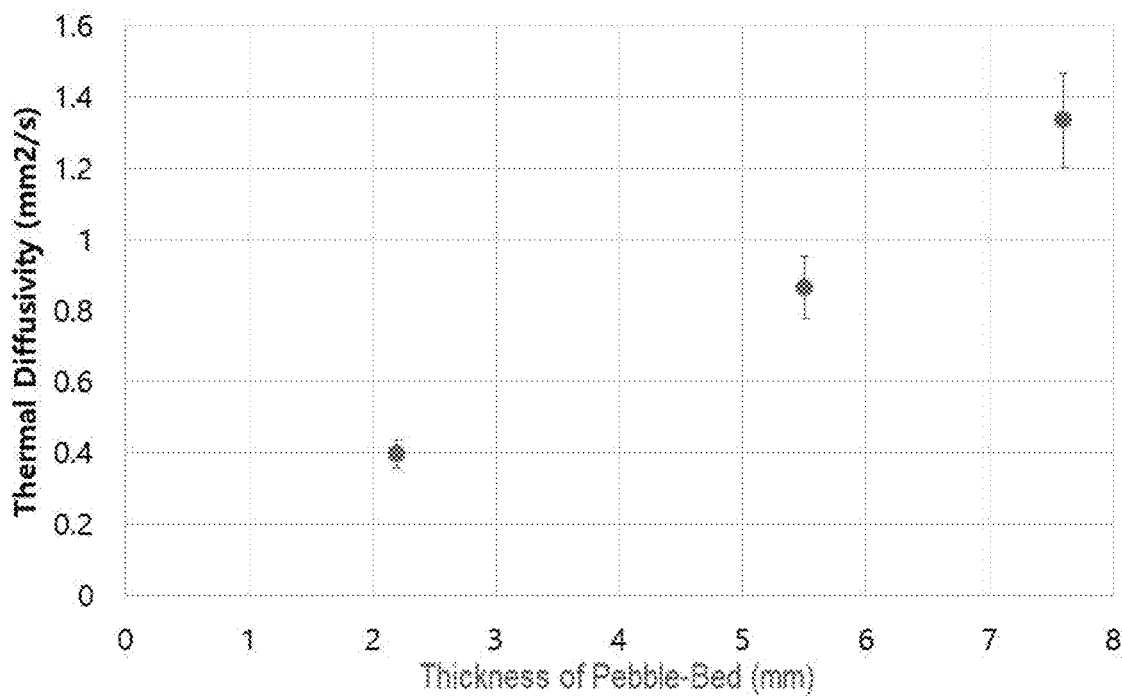
[FIG. 6]
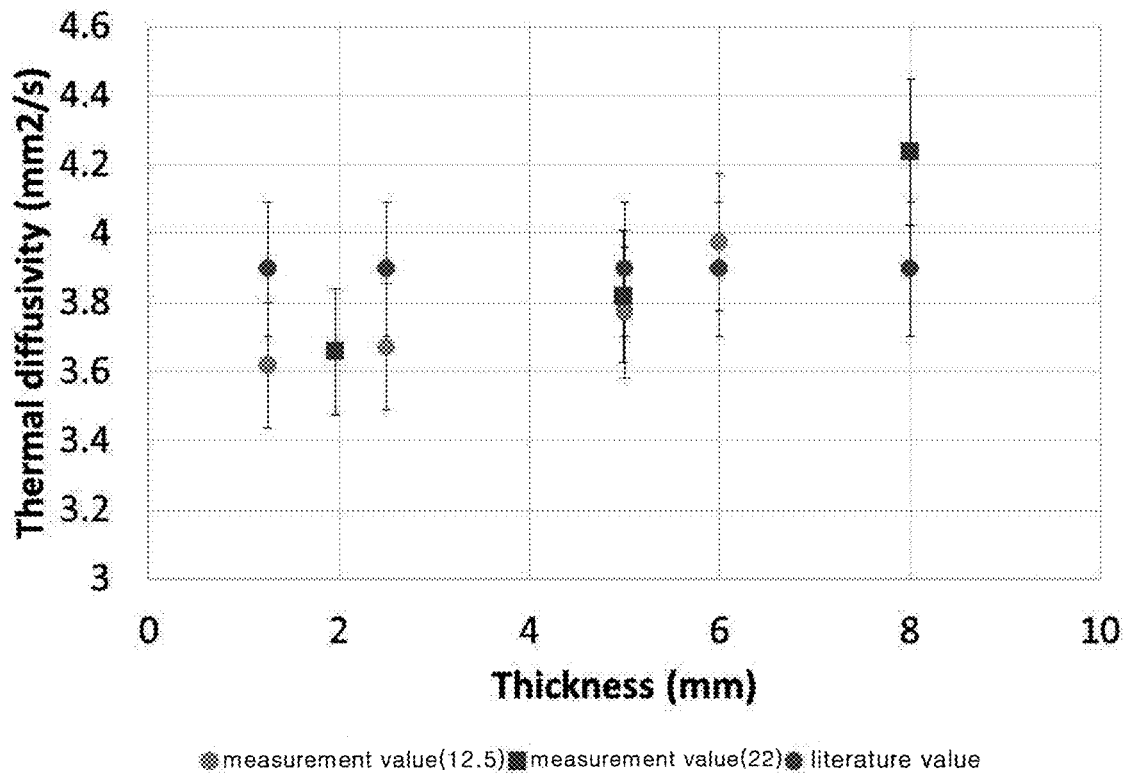
● measurement value(12.5) ■ measurement value(22) ● literature value

[FIG. 9]
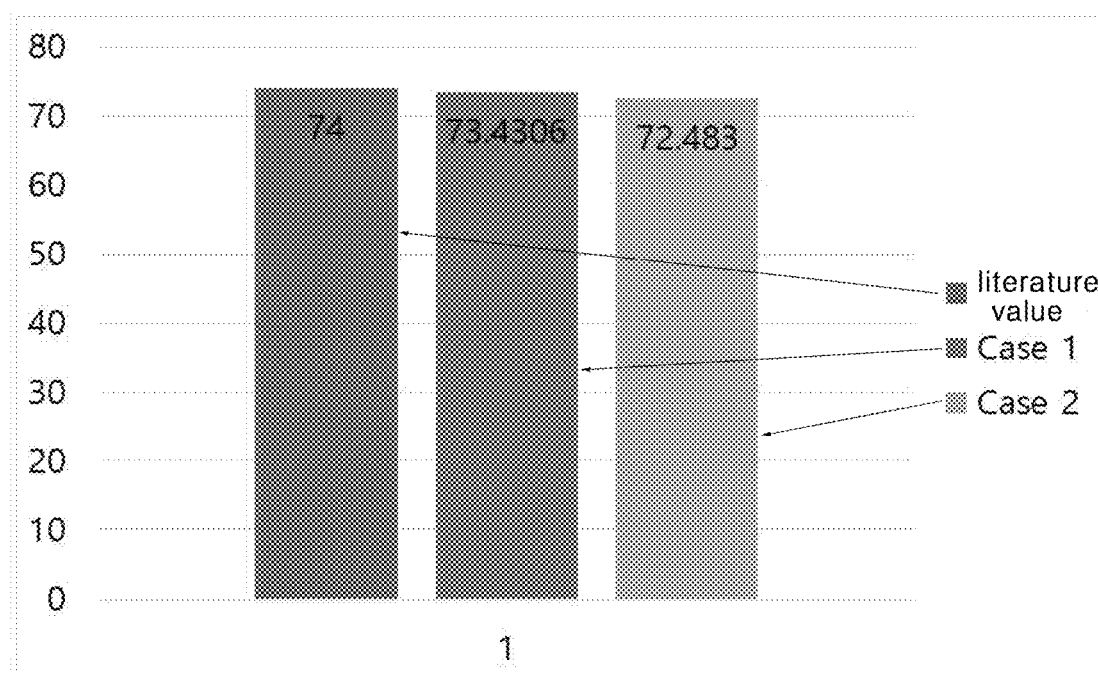
[FIG. 10]
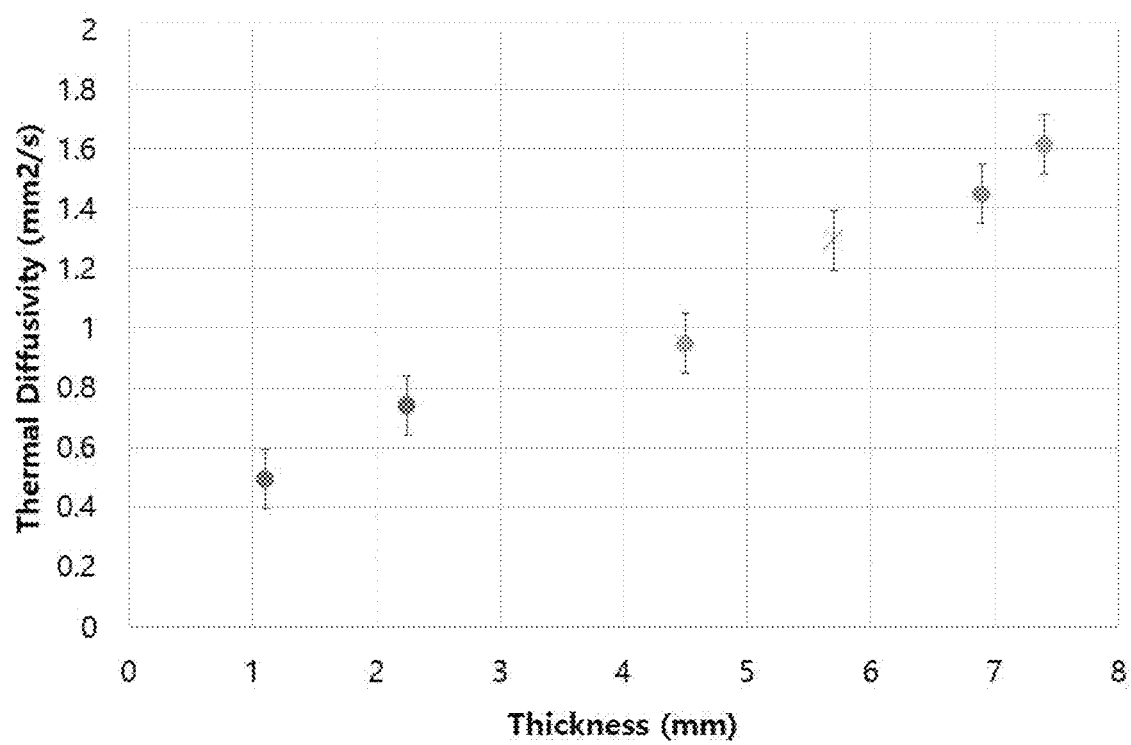

[FIG. 11]
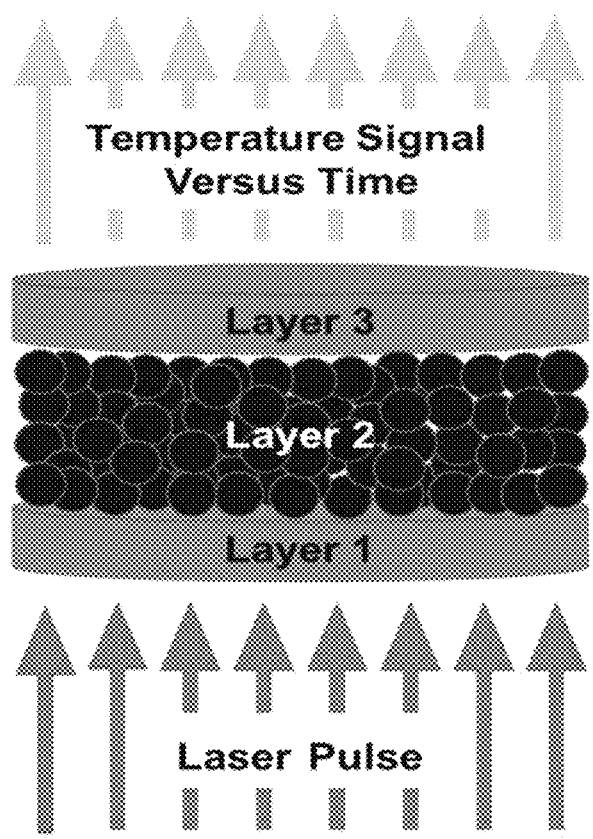

[FIG. 12]
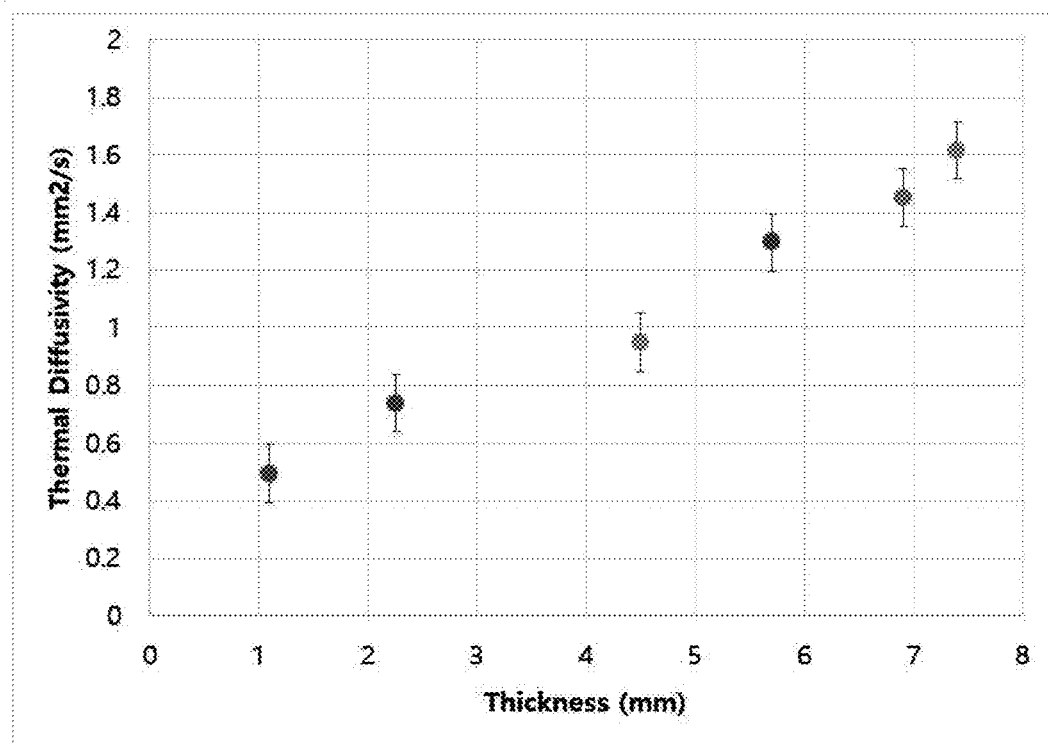
<Measurement value of effective thermal diffusivity using 1-layer method>

[FIG. 13]
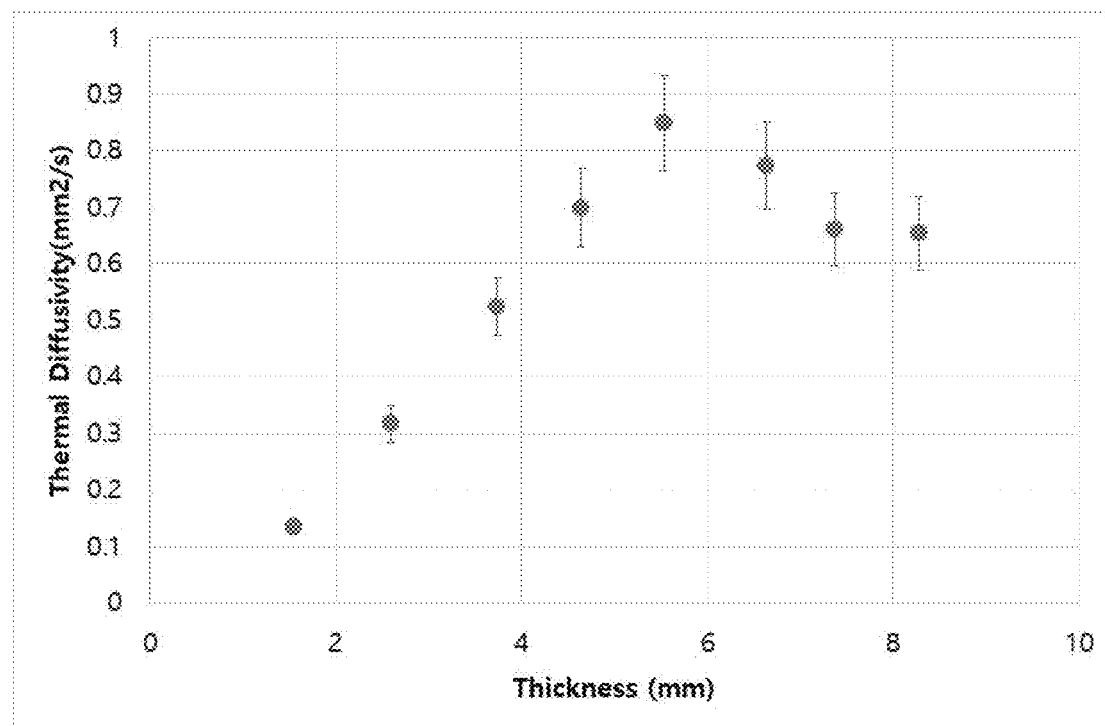
<Measurement value of effective thermal diffusivity using 1-layer method>
[FIG. 14]
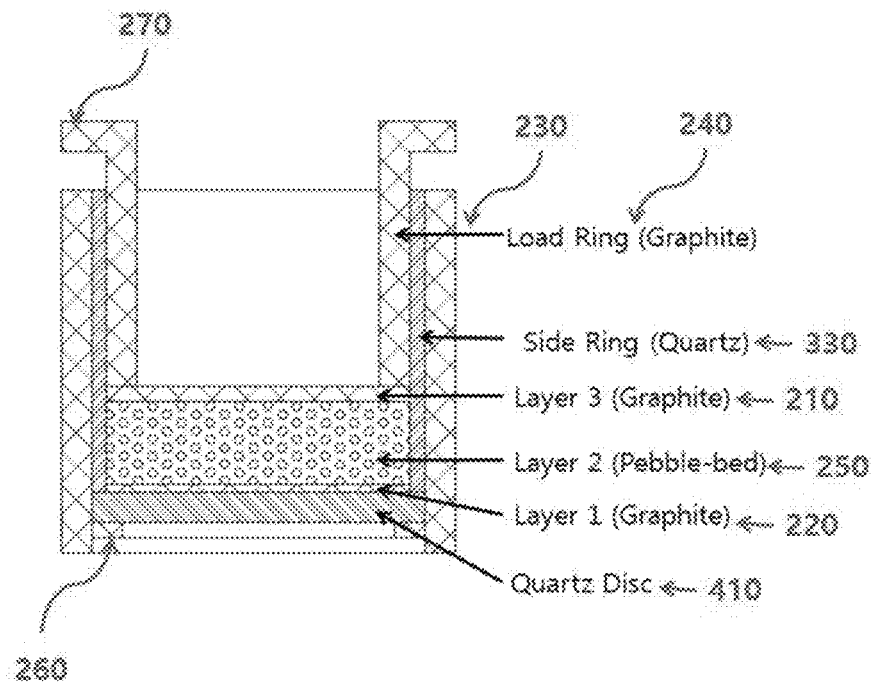

[FIG. 15]
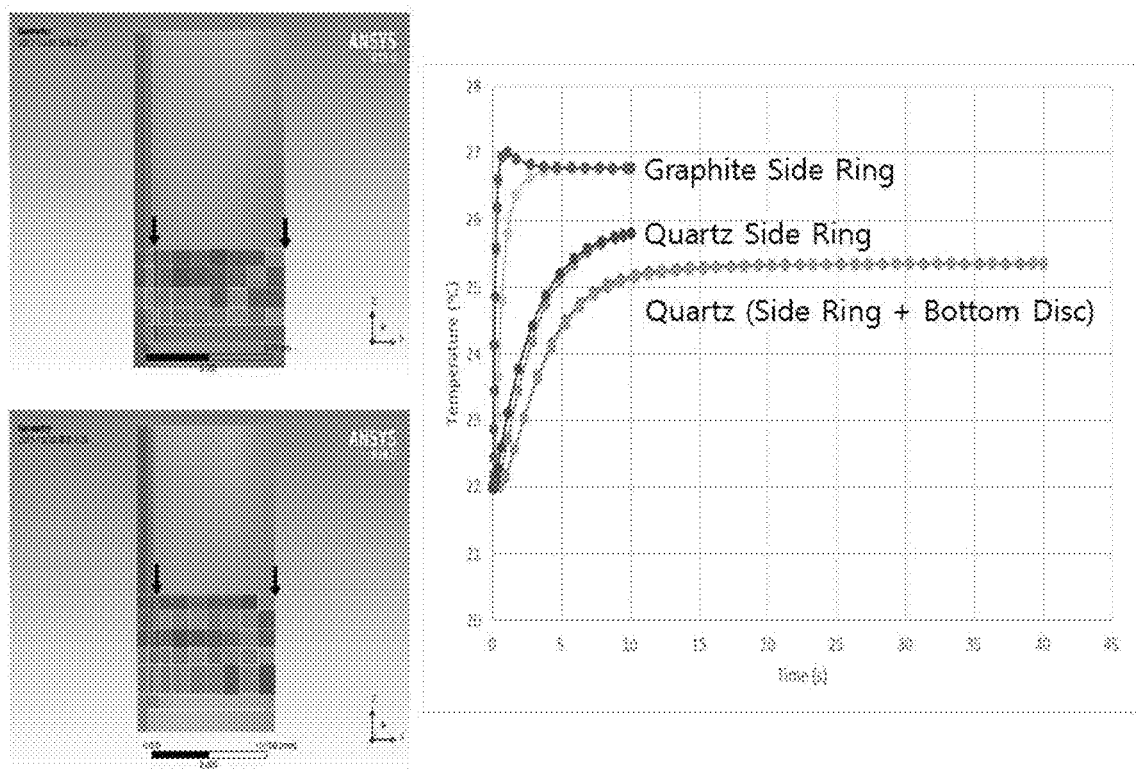
[FIG. 16]
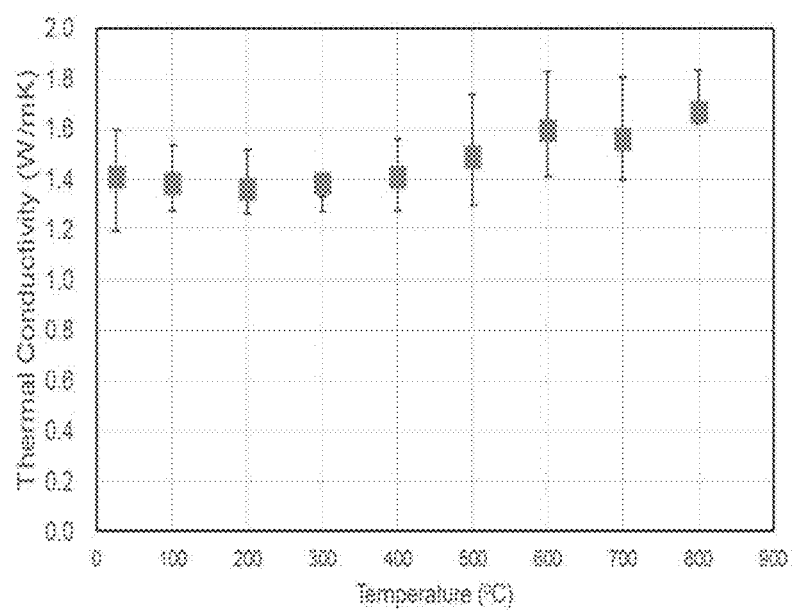

[FIG. 17]
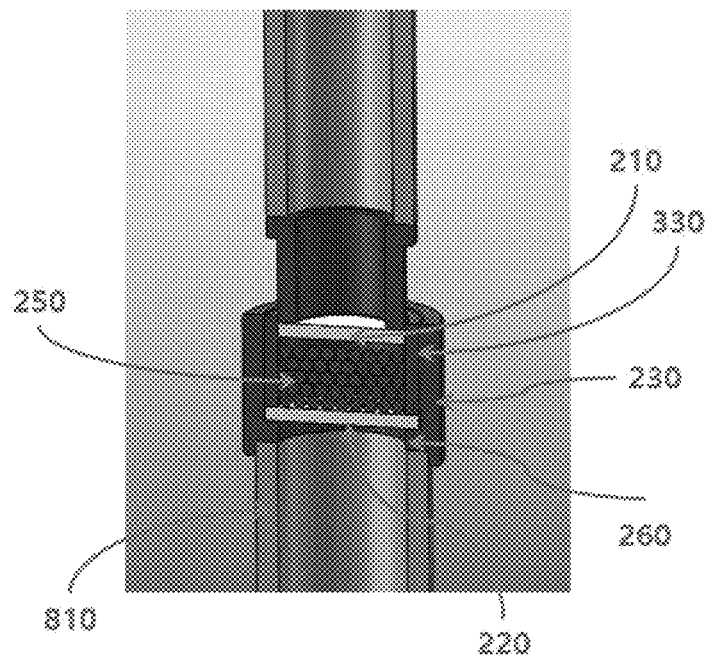

SAMPLE HOLDER ASSEMBLY FOR EFFECTIVE THERMAL CONDUCTIVITY MEASUREMENT OF PEBBLE-BED IN LASER FLASH APPARATUS

CROSS-REFERENCE TO RELATED APPLICATION

This application claims the benefit of Korean patent application No. 10-2018-0038527 filed on Apr. 3, 2018, the entire contents of which are incorporated herein by reference in their entirety.

BACKGROUND

Technical Field

The present disclosure relates to a sample holder assembly for a laser flash apparatus for measuring a thermal conductivity of a pebble-bed.

Related Art

Measurement of a thermal conductivity, especially a thermal diffusivity, of a particle bed meaning a collection of particles may be necessary for a variety of reasons. For example, in the case of a pebble-bed used in a nuclear-fusion, a study of a thermal conductivity of the pebble-bed in a bleeding blanket is needed to verify stability of the breeding blanket design.

Currently, the thermal conductivity of the particle bed such as the pebble-bed is measured, for example, using a hot wire, hot disc, etc. [Refer to W. J. Parker et al., Flash method of determining thermal diffusivity, heat capacity, and thermal conductivity, Journal of Applied Physics 32 (1961) 1679-1684]. However, this method requires a lot of time, requires a large amount of a sample, and, thus, has a disadvantage that measurement cost is high in the case of expensive pebbles.

Known methods for measuring thermal conductivity include a laser flash method. The laser flash method has the advantage that it may measure the thermal conductivity over a wide range, is more accurate, repeatable and measures the thermal conductivity in a short time. However, the laser flash method has a limitation in that only a sample of a solid circular disc may be measured.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure provides a sample holder assembly for a laser flash apparatus capable of measuring a thermal conductivity of a pebble-bed as a collection of particles using a laser flash method.

In one aspect of the present disclosure, there is provided a sample holder assembly for a laser flash apparatus for measuring a thermal conductivity of a pebble-bed, the assembly comprising: a tubular sample container configured to be mounted on a sample carrier tube for the laser flash apparatus, wherein the sample container has open top and bottom; a bottom disc disposed in the sample container to block the open bottom of the sample container and configured for delivering a laser from a laser flash unit of the apparatus to a pebble-bed; the pebble-bed packed on the bottom disc to a predetermined thickness; and a top disc disposed on the pebble-bed and in the sample container to block the open top of the sample container and configured for receiving heat from the pebble-bed to transfer the heat upward.

As used herein, the sample holder assembly for the laser flash apparatus refers to a means for holding an object to be measured in the laser flash apparatus. According to the present disclosure, the thermal conductivity of a pebble-bed (a packed aggregate of particles) is measured. In this regard, the pebble-bed may not have a fixed specific form. Thus, the sample holder assembly is configured for packing and holding the pebble-bed into a disc shape that may be used in the laser flash apparatus.

The sample carrier tube acts as an intermediate passage through which laser light from a laser flash unit of the laser flash apparatus is transferred to a corresponding sample. The sample holder assembly according to the present disclosure is configured to be easily mounted on the typical sample carrier tube.

The bottom disc supports the pebble-bed and transmits the laser energy to the pebble-bed. The bottom disc is preferably a flat substrate having durability against high temperature and capable of absorbing laser light energy. The bottom disc may be made of graphite. Alternatively, the bottom disc may include a light-transmissive durable disc made of sapphire, and a graphite coating coated on one face of the sapphire disc. This is because that if the bottom disc is only made of a light-transmissive material, the laser light may be directly incident on the surfaces of unevenly distributed particles, and, thus, uniform light incidence may not be achieved.

The top disc serves to pack the pebble-bed and to transfer the heat from the pebble-bed upward. The heat transferred in the upward direction is measured by a thermal measurement unit installed at the top. Like the bottom disc, the top disc is preferably embodied as a flat substrate which is heat resistant and evenly transmits light beams upward. The top disc may be made of graphite. Alternatively, the top disc may include a light-transmissive durable disc made of sapphire, and a graphite coating coated on one face of the sapphire disc. This is because that if the top disc is only made of a light-transmissive material, heat emission from the surfaces of unevenly distributed particles may be measured and, thus, uniform heat emission measurement may not be achieved.

In one embodiment, the assembly further comprises a tubular load ring having an outer diameter smaller than an inner diameter of the sample container so as to press the top disc toward the bottom disc to pack the pebble-bed.

In one embodiment, the assembly further comprises a side ring disposed between an inner face of the sample container and an outer side face of the pebble-bed and surrounding the outer side face of the pebble-bed to block transfer of heat from the pebble-bed to the inner face of the sample container. In one embodiment, wherein the side ring is made of quartz or concrete.

In one embodiment, the assembly further comprises a tubular load ring having an outer diameter smaller than an inner diameter of the sample container so as to press the top disc toward the bottom disc to pack the pebble-bed, wherein the side ring extends upwards to the top of the container and is disposed between the inner face of the sample container and the outer side face of the pebble-bed and outer side faces of the top disc and the tubular load ring.

In one embodiment, the side ring is disposed between the inner face of the sample container and the outer side face of the pebble-bed and outer side faces of the bottom and top discs and surrounds the outer side face of the pebble-bed to block transfer of heat from the pebble-bed to the inner face of the sample container.

In one embodiment, the assembly further comprise a light-transmission disc covering bottom and side faces of the packed pebble-bed and having an insulating property. In one embodiment, the light-transmission disc is made of quartz. The light-transmission disc can transmit therethrough laser light to the bottom disc, and prevents light from the pebble-bed from being lost in a direction other than the upward direction.

In one embodiment, a graphite coating is formed on the light-transmission disc, wherein the coating is disposed between the light-transmission disc and the bottom face of the bed. In one embodiment, each of the top and bottom discs is made of graphite. The bottom disc is preferably made of a material such as graphite which is capable of fully absorbing laser light and is durable to high temperatures. The bottom disc has a flat surface to absorb laser light evenly. In the case where the bottom disc is made only of a light-transmissive material, laser light energy may be directly transferred to the pebble-bed. In this connection, the outer surface of the bubble bed is not flat due to the uniformly distributed particles. Thus, the uniform transfer of light cannot be achieved. For this reason, in one embodiment, each of the top and bottom discs is light-transmissive, wherein first and second graphite coatings are formed on the top and bottom discs respectively, wherein the first coating is disposed between the top disc and a top face of the bed, wherein the second coating is disposed between the bottom disc and a bottom face of the bed.

In one embodiment, the tubular load ring has a hat brim extending radially outwardly from a first end of the load ring opposite a second end thereof inserted in the sample container, wherein the hat brim covers the sample container.

In one embodiment, the sample container includes an annular inner step extending inwardly from an inner face of the container, wherein a bottom face of the annular inner step of the sample container is mounted on the sample carrier tube such that the sample holder assembly is mounted on the sample carrier tube, wherein the bottom disc is disposed on a top face of the annular inner step.

In one embodiment, the assembly further comprises a tubular load ring having an outer diameter smaller than an inner diameter of the sample container so as to press the top disc toward the bottom disc to pack the pebble-bed, wherein the sample container has an annular inner step extending inwardly from an inner face of the container, wherein a bottom face of the annular inner step of the sample container is mounted on the sample carrier tube such that the sample holder assembly is mounted on the sample carrier tube, wherein the assembly further includes a quartz disc disposed on a top face of the annular inner step, wherein the bottom disc, the pebble-bed and the top disc are sequentially stacked on the quartz disc, wherein the assembly further includes a side ring disposed between outer side faces of the bottom disc, the pebble-bed, the top disc, and the load ring and an inner face of the sample container, wherein the side ring is configured for blocking heat transmission from the packed pebble-bed to the inner face of the container, wherein the tubular load ring has a hat brim extending radially outwardly from a first end of the load ring opposite a second end thereof inserted in the sample container, wherein the hat brim covers the sample container. In one embodiment, each of the sample container, the top and bottom discs is made of graphite, wherein the side ring is made of quartz.

Using the sample holder assembly of the present disclosure, the thermal conductivity of the particles may be measured effectively by laser flash method. Further, the sample holder assembly according to the present disclosure may be easily applied to a conventional laser flash apparatus.

BRIEF DESCRIPTION OF THE DRAWINGS

The accompanying drawings, which are incorporated in and form a portion of this specification and in which like numerals depict like elements, illustrate embodiments of the present disclosure and, together with the description, serve to explain the principles of the disclosure:

FIG. 3 shows results of the measurement of the thermal diffusivity based on a thickness of a $Li_2TiO_3$ pebble according to the first sample holder assembly of the present disclosure.

FIG. 4 shows results of the thermal diffusivity measurement based on a thickness of an alumina pebble according to the first sample holder assembly of the present disclosure.

FIG. 5 shows measurement of the thermal diffusivity based on a thickness of a graphite pebble according to the first sample holder assembly of the present disclosure.

FIG. 6 shows measurement of the thermal diffusivity based on a thickness of bulk SS304 according to the first sample holder assembly of the present disclosure.

FIG. 9 shows thermal diffusivities of a standard sample (Poco-Graphite) when using the second sample holder assembly, when not using the second sample holder assembly, and a thermal diffusivity based on a literature value.

FIG. 10 shows a thermal diffusivity based on a thickness of $Al_2O_3$ pebble using the second sample holder assembly.

FIG. 11 is a diagram illustrating a 3-layer method.

FIG. 12 shows a thermal diffusivity based on a thickness of SS304 bulk using a 1-layer method when using the second sample holder assembly.

FIG. 13 shows a thermal diffusivity on a thickness of SS304 bulk using a 3-layer method when using the second sample holder assembly, where each of the first and third layers includes SS304.

FIG. 14 shows a third sample holder assembly for electrical conductivity measurement of the pebble-bed in accordance with the present disclosure.

FIG. 15 provides ANSYS results for the third sample holder assembly in accordance with the present disclosure.

FIG. 16 is a graph indicating a result of measuring a thermal conductivity of $Li_2TiO_3$ pebble-bed using the third sample holder assembly.

FIG. 17 illustrates a state in which a sample holder assembly in accordance with the present disclosure is mounted to a laser flash apparatus.

DETAILED DESCRIPTIONS

Figure 1:
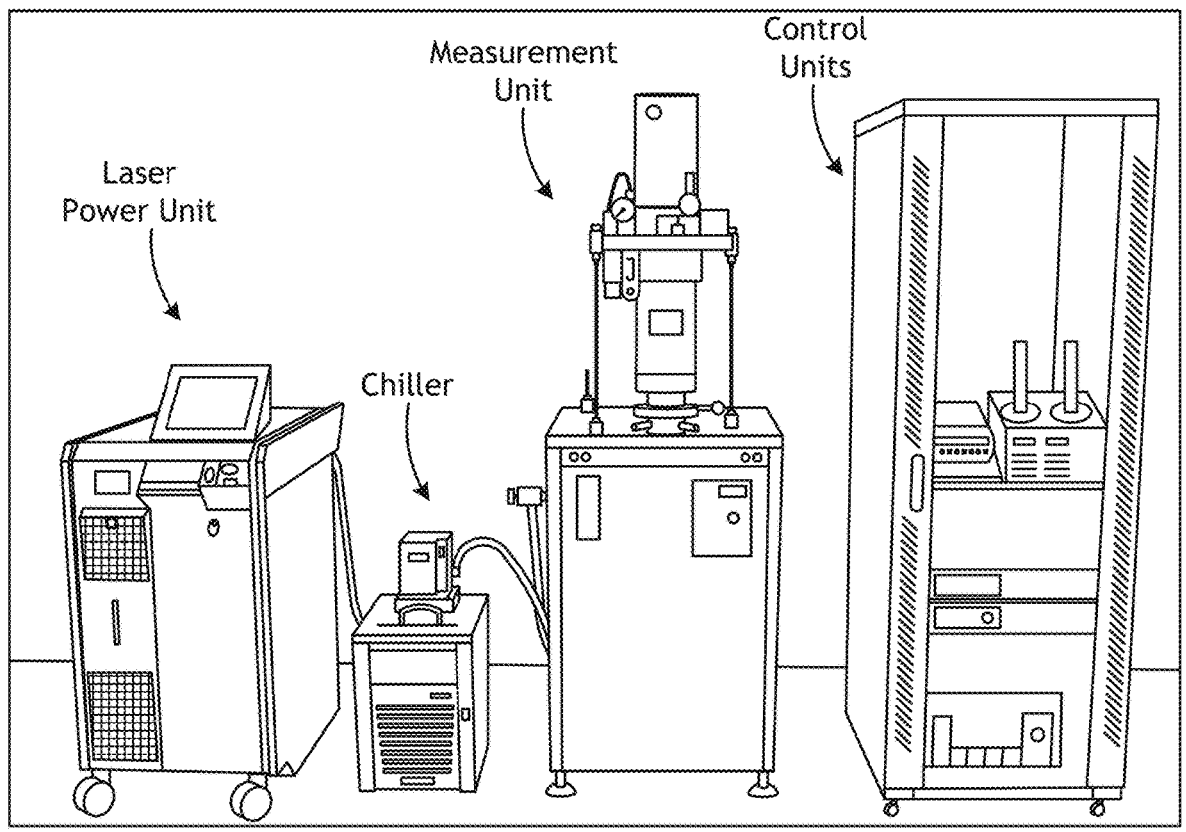
FIG. 1 shows a laser flash apparatus including a laser power unit, a chiller, a measurement unit, and a control unit.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure.

The present disclosure provides a sample holder assembly for a laser flash apparatus to measure the thermal conductivity of the pebble-bed.

The structure of the sample holder assembly according to the present disclosure will be described in detail below with reference to the drawings.

Figure 2:
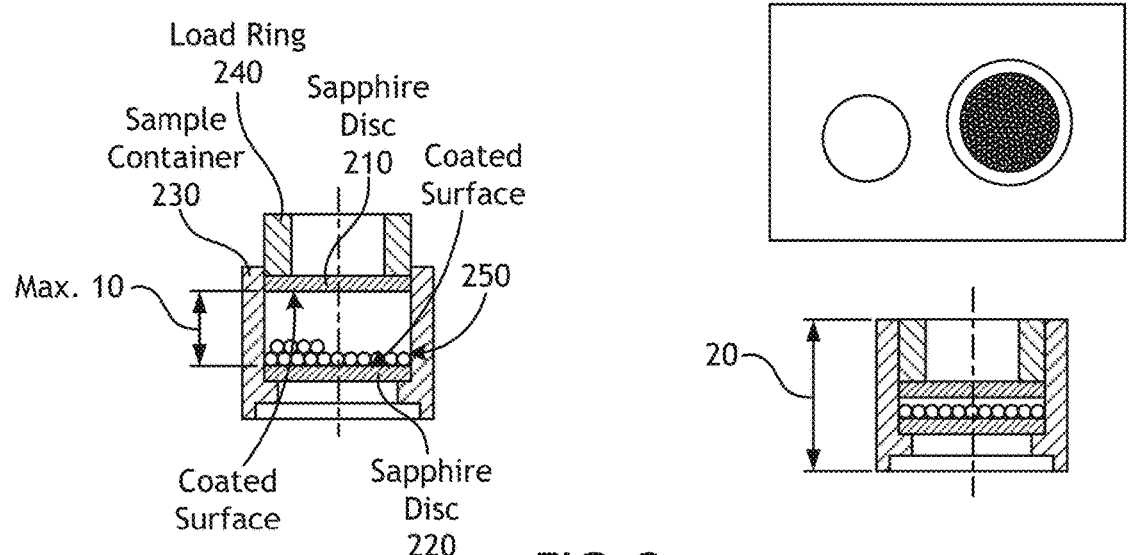
FIG. 2 shows a first sample holder assembly for electrical conductivity measurement of a pebble-bed in accordance with the present disclosure.

FIG. 2 illustrates a first sample holder assembly according to the present disclosure.

The first sample holder assembly according to the present disclosure may include: a tubular sample container 230 configured to be mounted on a sample carrier tube for the laser flash apparatus, wherein the sample container has open top and bottom; a bottom disc 220 disposed in the sample container to block the open bottom of the sample container and configured for delivering a laser from a laser flash unit to a pebble-bed; the pebble-bed 250 packed on the bottom disc to a predetermined thickness; a top disc 210 disposed on the pebble-bed and in the sample container to block the open top of the sample container and configured for receiving heat from the pebble-bed to transfer the heat upward; and a tubular load ring 240 having an outer diameter smaller than an inner diameter of the sample container so as to press the top disc toward the bottom disc to pack the pebble-bed.

Figure 7:
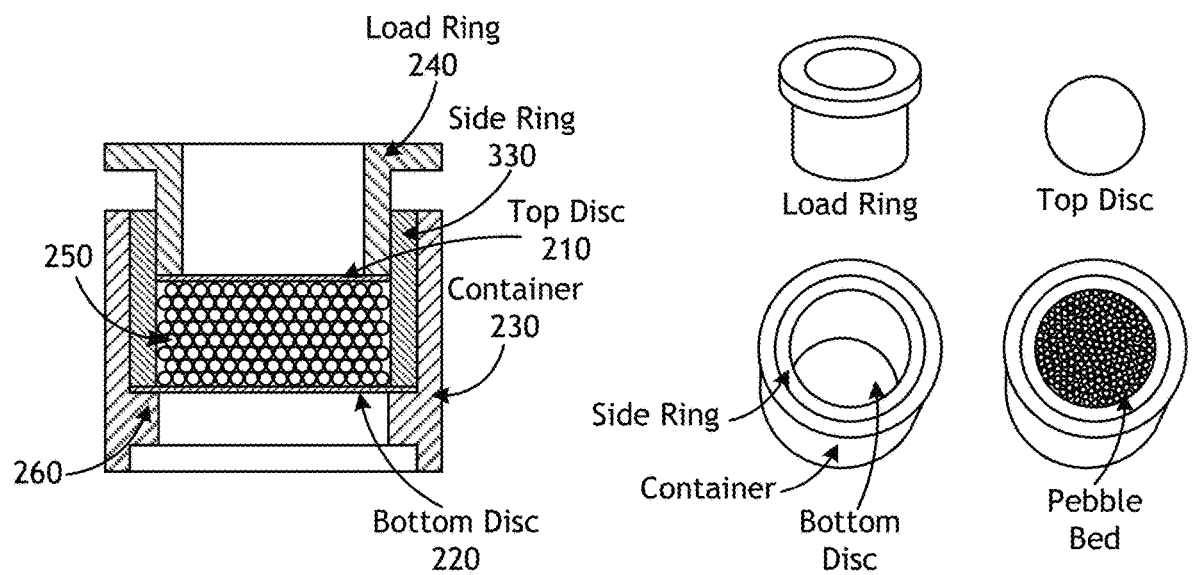
FIG. 7 shows a second sample holder assembly for electrical conductivity measurement of the pebble-bed in accordance with the present disclosure.

FIG. 7 illustrates a second sample holder assembly as a more preferred example of a sample holder assembly according to the present disclosure.

The second sample holder assembly according to the present disclosure may include: a tubular sample container 230 configured to be mounted on a sample carrier tube for the laser flash apparatus, wherein the sample container has open top and bottom; a bottom disc 220 disposed in the sample container to block the open bottom of the sample container and configured for delivering a laser from a laser flash unit to a pebble-bed; the pebble-bed 250 packed on the bottom disc to a predetermined thickness; a top disc 210 disposed on the pebble-bed and in the sample container to block the open top of the sample container and configured for receiving heat from the pebble-bed to transfer the heat upward; a tubular load ring 240 having an outer diameter smaller than an inner diameter of the sample container so as to press the top disc toward the bottom disc to pack the pebble-bed; and a side ring 330 disposed between an inner face of the sample container and an outer side face of the pebble-bed and surrounding the outer side face of the pebble-bed to block transfer of heat to the inner face of the sample container. The side ring is made of quartz.

FIG. 14 illustrates a third sample holder assembly as a more preferred example of a sample holder assembly according to the present disclosure.

The third sample holder assembly according to the present disclosure may include: a tubular sample container 230 configured to be mounted on a sample carrier tube for the laser flash apparatus, wherein the sample container has open top and bottom; a bottom disc 220 disposed in the sample container to block the open bottom of the sample container and configured for delivering a laser from a laser flash unit to a pebble-bed; the pebble-bed 250 packed on the bottom disc to a predetermined thickness; a top disc 210 disposed on the pebble-bed and in the sample container to block the open top of the sample container and configured for receiving heat from the pebble-bed to transfer the heat upward; a tubular load ring 240 having an outer diameter smaller than an inner diameter of the sample container so as to press the top disc toward the bottom disc to pack the pebble-bed; a side ring 330 disposed between an inner face of the sample container and an outer side face of the pebble-bed and surrounding the outer side face of the pebble-bed to block transfer of the heat to the inner face of the sample container; and a light-transmission disc 410 covering bottom and side faces of the packed pebble-bed and having an insulating property. The light-transmission disc can transmit therethrough laser light to the bottom disc, and prevents light from the pebble-bed from being lost in a direction other than the upward direction. The light-transmission disc may be made of quartz.

The sample container includes an annular inner step 260 extending inwardly from an inner face of the container. A bottom face of the annular inner step of the sample container is mounted on the sample carrier tube such that the sample holder assembly is mounted on the sample carrier tube. A quartz disc 410 is disposed on the top face of the annular inner step. The bottom disc 230, the pebble-bed 250 and the top disc 210 are arranged on the quartz disc in this order. Between the outer side faces of the bottom disc/the pebble-bed/top disc and the outer side faces of the load ring 240 and the inner face of the sample container 230, a side ring 330 is disposed for blocking heat transmission from the packed pebble-bed to the inner face of the container.

Further, the load ring 240 may include a hat brim 270 extending radially outwardly from an end opposite an end inserted in the sample container and covering the sample container. The sample container, the top disc, and the bottom disc are each made of graphite. Further, the side ring is made of quartz.

Referring to FIG. 17, the sample container includes the annular inner step 260 extending inwardly from an inner face of the container. A bottom face of the annular inner step of the sample container is mounted on the sample carrier tube 810 such that the sample holder assembly is mounted on the sample carrier tube 810. The bottom disc 230 is disposed on the top face of the annular inner step 260. The pebble-bed 250 and the top disc 210 are arranged on the bottom disc in this order.

1. Experimental Apparatus

FIG. 1 is a photograph of a laser flash apparatus a LFA 427 model available from NETZSCH. The laser flash apparatus includes a laser power unit that provides a laser source, a chiller that supplies cooling water to the laser power unit, a measurement unit that measures the sample, and a control unit that controls each component of the laser flash apparatus.

2. Measurement of Thermal Diffusivity

The thermal diffusivity of the graphite pebble-bed is measured based on one-dimensional transient heat transfer equation. The thermal diffusivity may be calculated using an equation of time-based temperature change, using a half-time (t½, a time to a half of the maximum temperature change) and the sample thickness d. The thermal diffusivity affects the heat transfer process inside the material, and has the form of the square of the length per hour. The thermal diffusivity has a following relationship using a thermal conductivity, a specific heat Cp, and a density:

$$\alpha = \frac{\lambda}{\rho C_p}$$

3. Performance Evaluation of First Sample Holder Assembly 3.1 First Sample Holder Assembly FIG. 2 shows the first sample holder assembly for the electrical conductivity measurement of the pebble-bed in accordance with the present disclosure. The sample holder assembly according to the first embodiment includes a sapphire top disc 210, a sapphire bottom disc 220, a sample container 230, and a load ring 240. On each of the faces of the discs facing the bed, a graphite coating is formed to absorb and release the laser. graphite pebbles as sample particles are filled between the top and bottom discs in the sample container.

3.2. $Li_2TiO_3$ (Japan) Pebble-Bed Experiment

Experimental Objective: For the performance test of the first sample holder assembly, the applicant uses $Li_2TiO_3$ (Japan) to measure effective thermal diffusivity thereof as follows:

Test method: A graphite coating is applied on a top face of the 1-layer sapphire disc and then the disc is inserted into the container. The pebbles are filled, with the desired thickness, into the sample container. After forming a graphite coating on the bottom face of the 3-layer sapphire disc, the disc covers the top face of the pebble-bed. After fitting the load ring into the container, the inside of the pebble-bed is vacuumed using a vacuum pump. Then, He gas is injected in the sample container in a vacuum state to bring the inside in the container to an atmospheric pressure. The thermal diffusivity is measured based on the sample thickness at a room temperature.

The experimental conditions are shown in Table 1 below.

TABLE 1

| Parameter | Value |
| --- | --- |
| Material | $Li_2TiO_3$ Pebble-bed |
| Thickness (mm) | 1.1 to 8 |
| Diameter (mm) | 22 |
| Specific Heat (J/g/K) | 0.709 |
| Density (kg/m$^3$) | 1780 |
| Thermal diffusivity (mm$^2$/s) | ? |
| Temperature (° C.) | RT |

TABLE 1-continued

| Parameter | Value |
| --- | --- |
| Pressure | — |
| Atmosphere | He |

The experimental results are presented in FIG. 3. The pebble-bed measurements represent the average value of 10 measurements. The measured value is expressed with a percentage of an error bar of the corresponding value being 5%. As the thickness of the pebble-bed increases, the measured value thereof increases. The expected result is that the measured values converge when the thickness is larger than or equal to a certain thickness. It may be confirmed that the roundness of $Li_2TiO_3$ pebbles is not good and, thus, the contact between the pebbles is not good. As a result, a further experiment is planned using alumina pebbles with good roundness.

3.3 Alumina Pebble-Bed Experiment

Experimental Objective: Thermal diffusivity measurements of $Li_2TiO_3$ purchased from Japan do not converge. Therefore, it is found that the roundness of $Li_2TiO_3$ pebbles is not uniform. Thus, the applicant uses the alumina pebble-bed with a relatively uniform roundness to verify whether thermal diffusivity measurements thereof converge.

The experimental method is the same as the experimental method for the above $Li_2TiO_3$.

The experimental results are presented in FIG. 4. As in the $Li_2TiO_3$ purchased from Japan, as the thickness of the alumina pebble-bed increases, the measured value thereof increases. Therefore, the thermal diffusivity measurement experiment is performed based on the thickness using graphite pebbles.

3.4 Graphite Pebble-Bed Experiment

The experimental method is the same as the experimental method for the above $Li_2TiO_3$.

Experimental Results: Unlike predicted, as the thickness of the pebble-bed increases, the thermal diffusivity values increase as in $Li_2TiO_3$ and $Al_2O_3$. Subsequent experiments are carried out based on thickness using SS304 bulk rather than the graphite pebble. To this end, the pebble sample holder assembly is used for the test of the SS304 bulk.

3.5 Thickness-Based Testing Using SS304 in a Form of Bulk Rather than Pebble-Bed Experimental Objective: Thickness-based testing is performed using SS304 in a form of a bulk other than the pebble-bed. The measurement performance of the pebble sample holder assembly is evaluated by using the bulk form rather than the pebble-bed.

Test method: A SS304 disc with a graphite coating formed therein is placed on the 1-layer sapphire disc. Then, the 3-layer sapphire disc is placed on the SS304 disc. After fitting the load ring into the container, the inside of the container is vacuumed using a vacuum pump. Then, He gas is injected in the sample container in a vacuum state to bring the inside in the container to an atmospheric pressure. The thermal diffusivity is measured based on the sample thickness at a room temperature.

Experimental conditions: SS304 thermal diffusivity and specific heat refer to material properties of ITER MPH.

The experimental results are shown in FIG. 6. As described above, the thermal diffusivity values of $Li_2TiO_3$, $Al_2O_3$, and graphite pebble-beds increased without convergence. Therefore, the applicant measured the thermal diffusivity value based on the thickness of the sample SS304 bulk using the sample holder assembly. Experimental results show that for SS304, as the sample thickness increases, the thermal diffusivity value increases. Compared with the literature value, when the sample thickness of the SS04 bulk is 2 mm to 5 mm, the thermal diffusivity value has around 5% difference from the literature value.

When the sample thickness of the SS04 bulk is 8 mm, the thermal diffusivity value has 10% or larger difference from the literature value. It may be seen that an error range is larger than in the thermal diffusivity measurement experiment based on the thickness using the existing standard sample holder assembly.

4. Performance Evaluation of Second Sample Holder Assembly 4.1 Second Sample Holder Assembly FIG. 7 illustrates a second sample holder assembly as an improved version of the first sample holder assembly for measuring the thermal conductivity of the particle bed. The improved second sample holder assembly includes a side ring 330 to suppress heat loss in a radial direction. The side ring is made of graphite (1000 W/m·k) or the side ring is made of concrete (1.63 W/m·k). Further, to avoid detection of noise signals from the top surfaces of the sample container and side ring, the load ring has a hat brim 240. In addition, instead of the sapphire disc, each of the top and bottom discs 330 and 340 is made of 0.5 mm thick stainless steel as a heat transfer media. A graphite coating is formed on each of top and bottom discs 330 and 340. Remaining components of the assembly are made of graphite. The second sample holder assembly uses the existing sample container. The side ring mounted on the wall of the sample container prevents the contact between the sample and the sample container to suppress the radial heat loss. The load ring has a hat brim, which blocks temperature signals from gaps around the side ring.

4.2 SS304 Bulk Experiment Using Second Pebble Sample Holder Assembly

Experimental objective: The measurement of sample SS304 using the second sample holder assembly and the measurement of sample SS304 without the new second sample holder assembly are compared with each other.

Test method: The thermal diffusivity measured using the second sample holder assembly and the thermal diffusivity measured without using the second sample holder assembly are compared with each other. Thus, the performance of the new second sample holder assembly is grasped.

Figure 8:
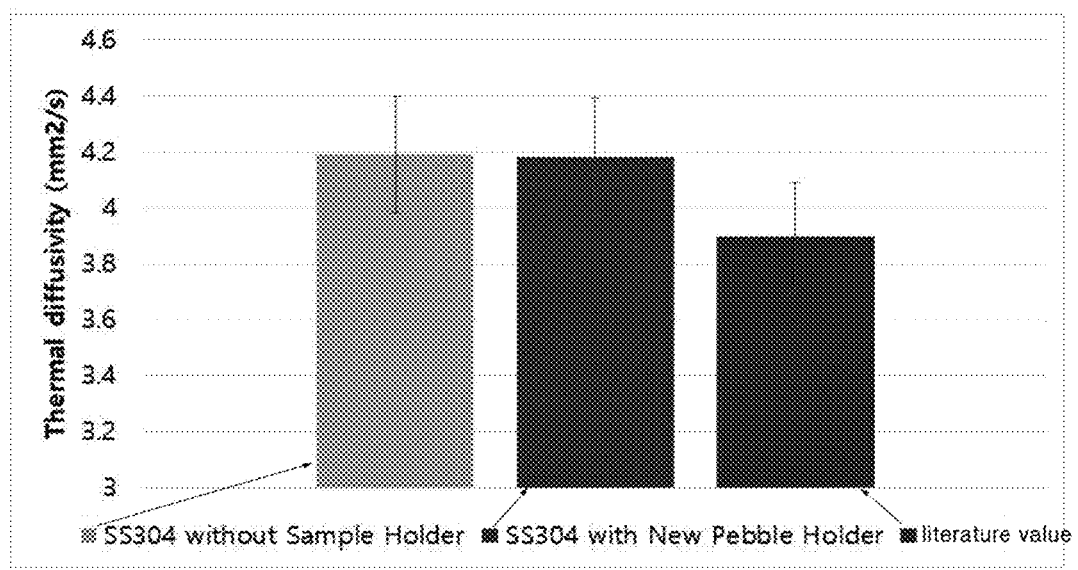
FIG. 8 shows thermal diffusivities of SS304 bulk when using the second sample holder assembly, when not using the second sample holder assembly, and a thermal diffusivity based on a literature value.

Experimental result: The measurement of sample SS304 using the second sample holder assembly and the measurement of sample SS304 without the new second sample holder assembly are compared with each other. To this end, the thermal diffusivity measured using the second sample holder assembly and the thermal diffusivity measured without using the second sample holder assembly are compared with each other. Thus, the performance of the new second sample holder assembly is grasped. As shown in FIG. 8, the thermal diffusivity measured using the second sample holder assembly and the thermal diffusivity measured without using the second sample holder assembly are substantially equal to each other. Further, each of the thermal diffusivity measured using the second sample holder assembly and the thermal diffusivity measured without using the second sample holder assembly has around 5% difference from the literature value.

4.3 Standard Sample (Poco-Graphite) Experiment Using Second Pebble Sample Holder Assembly Experimental objective: The measurement of standard sample (Poco-graphite) using the second sample holder assembly and the measurement of standard sample (Poco-graphite) without the new second sample holder assembly are compared with each other.

Test method: The thermal diffusivity measured using the second sample holder assembly and the thermal diffusivity measured without using the second sample holder assembly are compared with each other. Thus, the performance of the new second sample holder assembly is grasped.

Experimental result: The measurement of standard sample (Poco-graphite) using the second sample holder assembly and the measurement of standard sample (Poco-graphite) without the new second sample holder assembly are compared with each other. To this end, the thermal diffusivity measured using the second sample holder assembly and the thermal diffusivity measured without using the second sample holder assembly are compared with each other. Thus, the performance of the new second sample holder assembly is grasped. As shown in FIG. 9, the thermal diffusivity measured using the second sample holder assembly has 5% or smaller difference from the literature value. As shown in FIG. 9, the thermal diffusivity measured without using the second sample holder assembly has around 1% difference from the literature value. In this connection, the standard sample thermal diffusivity measurement error provided by the manufacturer, NETZSCH is about 5%. Thus, the pebble-bed measurement is performed using the second sample holder assembly.

4.4 Thickness-Based Experiment for $Al_2O_3$ Pebble-Bed

Experimental Objective: The new second sample holder assembly is used to measure the effective thermal diffusivity of sample $Al_2O_3$ with uniform pebble size. This confirms the performance of the new sample holder assembly.

Test method: A graphite coating is applied on a top face of the 1-layer sapphire disc and then the disc is inserted into the container. The $Al_2O_3$ pebbles are filled, with the desired thickness, into the sample container. After forming a graphite coating on the bottom face of the 3-layer sapphire disc, the disc covers the top face of the pebble-bed. After fitting the load ring into the container, the inside of the pebble-bed is vacuumed using a vacuum pump. Then, He gas is injected in the sample container in a vacuum state to bring the inside in the container to an atmospheric pressure. The thermal diffusivity is measured based on the sample thickness at a room temperature.

Experimental Results: As shown in FIG. 10, the thermal diffusivity measured using the second sample holder assembly is higher than the thermal diffusivity measured using the conventional sample holder assembly. However, even with the second sample holder assembly, the thermal diffusivity measurements increased as the thickness of the pebble-bed increased.

4.5 Measurement of Pebble-Bed Thermal Diffusivity Using 3-Layer Method

The applicant measures the pebble-bed thermal diffusivity using a 3-layer method. In the 3-layer method as shown in FIG. 11, the 1-layer receives a laser power and then transmits heat to the bed and then, the heat passes through the 2-layer sample. Then, measurement is executed at the 3-layer. Graphite may be employed for 1-layer and 3-layer materials. The fabrication and basic thermal properties of the 1-layer and 3-layer materials are shown in Table 2 below:

TABLE 2

| Parameter | Value |
| --- | --- |
| Material | SS304 |
| Thickness (mm) | 0.5 |

TABLE 2-continued

| Parameter | Value |
| --- | --- |
| Diameter (mm) | 22 |
| Specific Heat (J/g/K) | 0.470 |
| Density (kg/m$^3$) | 7905 |
| Thermal diffusivity (mm$^2$/s) | 3.901 |

Test method: the graphite 1-layer disc is inserted into the container. The pebbles are filled, with the desired thickness, into the sample container. The 3-layer graphite disc covers the top face of the pebble-bed. After fitting the load ring into the container, the inside of the pebble-bed is vacuumed using a vacuum pump. Then, He gas is injected in the sample container in a vacuum state to bring the inside in the container to an atmospheric pressure. The thermal diffusivity is measured based on the sample thickness at a room temperature. The experimental conditions are as shown in Table 3 below.

TABLE 3

| | Layer 1 | Layer 2 | Layer 3 |
| --- | --- | --- | --- |
| Material | SS304 | Graphite Pebble-bed | SS304 |
| Thickness (mm) | 0.5 | 1.1 to 7.52 | 0.5 |
| Diameter (mm) | 22 | 18 | 18 |
| Specific Heat (J/g/K) | 0.470 | 0.709 | 0.470 |
| Density (kg/m$^3$) | 7905 | 1780 | 7905 |
| Thermal diffusivity (mm$^2$/s) | 3.901 | ? | 3.901 |
| Temperature (° C.) | RT | RT | RT |
| Pressure Atmosphere | | He | |

As shown in FIGS. 12 and 13, the measured values using the 1-layer method using the second sample holder assembly increase. The values measured with the 3-layer method using the second sample holder assembly tend to increase when the thickness of the pebble is 6 mm or below 6 mm. The values measured with the 3-layer method using the second sample holder assembly tend to converge when the thickness of the pebble above 6 mm. The thermal diffusivity values measured by this method and the pebble sample holder assembly are similar to the preliminary experimental results. Test for other pebble-beds is performed additionally.

5. Performance Evaluation of Third Sample Holder Assembly 5.1 Third Sample Holder Assembly FIG. 14 illustrates the third sample holder assembly, an improved version of the first and second third sample holder assembles. The third sample holder assembly further comprises a tubular load ring 240 having an outer diameter smaller than an inner diameter of the sample container so as to press the top disc 210 toward the bottom disc to pack the pebble-bed. The sample container has an annular inner step 260 extending inwardly from an inner face of the container. A bottom face of the annular inner step of the sample container is mounted on the sample carrier tube 810 such that the sample holder assembly is mounted on the sample carrier tube. The assembly further includes a quartz disc 410 disposed on a top face of the annular inner step. The bottom disc, the pebble-bed and the top disc are sequentially stacked on the quartz disc. The assembly further includes a side ring 330 disposed between outer side faces of the bottom disc, the pebble-bed, the top disc, and the load ring and an inner face of the sample container, wherein the side ring is configured for blocking heat transmission from the packed pebble-bed to the inner face of the container. The tubular load ring 240 has a hat brim 270 extending radially outwardly from a first end of the load ring opposite a second end thereof inserted in the sample container, wherein the hat brim covers the sample container.

5.2 ANSYS Evaluation for Third Sample Holder Assembly

FIG. 15 provides ANSYS results for the third sample holder assembly. When the side ring and the bottom disc surrounding the sample container are made of quartz, the temperatures in the edge and the center of the top face of the sample vary in a substantially uniform manner. From this result, it may be concluded that there is no heat transfer out of the sample, and the heat transfers only to the sample. This configuration is most advantageous for measuring the thermal conductivity of the pebble-bed. FIG. 16 is a graph indicating a result of measuring a thermal conductivity of $Li_2TiO_3$ pebble-bed using the third sample holder assembly.

The invention claimed is:

1. A sample holder assembly for a laser flash apparatus for measuring a thermal conductivity of a pebble-bed, the assembly comprising:
   a tubular sample container configured to be mounted on a sample carrier tube for the laser flash apparatus, wherein the sample container has open top and bottom;
   a bottom disc disposed in the sample container to block the open bottom of the sample container and configured for delivering a laser from a laser flash unit of the apparatus to a pebble-bed;
   the pebble-bed packed on the bottom disc to a predetermined thickness; and
   a top disc disposed on the pebble-bed and in the sample container to block the open top of the sample container and configured for receiving heat from the pebble-bed to transfer the heat upward,
   wherein the assembly further comprises a tubular load ring having an outer diameter smaller than an inner diameter of the sample container so as to press the top disc toward the bottom disc to pack the pebble-bed,
   wherein the sample container has an annular inner step extending inwardly from an inner face of the container,
   wherein a bottom face of the annular inner step of the sample container is mounted on the sample carrier tube such that the sample holder assembly is mounted on the sample carrier tube,
   wherein the assembly further includes a quartz disc disposed on a top face of the annular inner step, wherein the bottom disc, the pebble-bed and the top disc are sequentially stacked on the quartz disc,
   wherein the assembly further includes a side ring disposed between outer side faces of the bottom disc, the pebble-bed, the top disc, and the load ring and an inner face of the sample container, wherein the side ring is configured for blocking heat transmission from the packed pebble-bed to the inner face of the container,
   wherein the tubular load ring has a hat brim extending radially outwardly from a first end of the load ring opposite a second end thereof inserted in the sample container, wherein the hat brim covers the sample container.

2. The sample holder assembly of claim 1, wherein the side ring is made of quartz or concrete.

3. The sample holder assembly of claim 1, wherein each of the top and bottom discs is made of graphite.

4. The sample holder assembly of claim 1, wherein the sample container is made of graphite.

5. The sample holder assembly of claim 1, wherein each of the sample container, the top and bottom discs is made of graphite, wherein the side ring is made of quartz.

* * * * *

UNITED STATES PATENT AND TRADEMARK OFFICE
CERTIFICATE OF CORRECTION

PATENT NO. : 10,928,338 B2
APPLICATION NO. : 15/983593
DATED : February 23, 2021
INVENTOR(S) : Yi-Hyun Park et al.

Page 1 of 1

It is certified that error appears in the above-identified patent and that said Letters Patent is hereby corrected as shown below:

On the Title Page

(71) Applicant:
Delete "KOREA BASIC SCIENCE INSTITUTE" and replace with --KOREA INSTITUTE OF FUSION ENERGY--.

(73) Assignee:
Delete "KOREA BASIC SCIENCE INSTITUTE" and replace with --KOREA INSTITUTE OF FUSION ENERGY--.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*